United States Patent
Middelfart

(10) Patent No.: US 7,630,961 B2
(45) Date of Patent: Dec. 8, 2009

(54) METHOD OF PROCESSING MULTI-LINGUAL QUERIES

(75) Inventor: Morten Middelfart, Hjørring (DK)

(73) Assignee: Targit A/S, Hjorring (DK)

( * ) Notice: Subject to any disclaimer, the term of this patent is extended or adjusted under 35 U.S.C. 154(b) by 149 days.

(21) Appl. No.: 10/412,648

(22) Filed: Apr. 11, 2003

(65) Prior Publication Data

US 2003/0229622 A1    Dec. 11, 2003

(30) Foreign Application Priority Data

Apr. 12, 2002   (EP)   .................................. 02388030

(51) Int. Cl.
*G06F 17/30* (2006.01)
*G06F 17/27* (2006.01)
*G06F 17/28* (2006.01)

(52) U.S. Cl. ..................... 707/3; 707/1; 707/6; 707/10; 704/2; 704/9

(58) Field of Classification Search ..................... 707/5, 707/3, 1, 10, 6; 704/9, 2
See application file for complete search history.

(56) References Cited

U.S. PATENT DOCUMENTS

| | | | | |
|---|---|---|---|---|
| 5,826,220 A * | 10/1998 | Takeda et al. | ................. | 704/7 |
| 5,873,055 A * | 2/1999 | Okunishi | ....................... | 704/2 |
| 5,956,711 A * | 9/1999 | Sullivan et al. | ................ | 707/6 |
| 6,006,221 A * | 12/1999 | Liddy et al. | .................... | 707/5 |
| 6,092,035 A * | 7/2000 | Kurachi et al. | ................. | 704/3 |
| 6,233,544 B1 * | 5/2001 | Alshawi | ......................... | 704/2 |
| 6,275,789 B1 * | 8/2001 | Moser et al. | ................... | 704/7 |
| 6,345,244 B1 * | 2/2002 | Clark | ............................. | 704/2 |
| 6,356,894 B2 * | 3/2002 | Nosohara | ....................... | 707/3 |
| 6,385,569 B1 * | 5/2002 | Kutsumi | ........................ | 704/7 |
| 6,535,842 B1 * | 3/2003 | Roche et al. | ................... | 704/7 |
| 6,598,039 B1 * | 7/2003 | Livowsky | ...................... | 707/3 |
| 6,604,101 B1 * | 8/2003 | Chan et al. | ..................... | 707/4 |
| 6,623,529 B1 * | 9/2003 | Lakritz | ....................... | 715/536 |
| 7,058,626 B1 * | 6/2006 | Pan et al. | ....................... | 707/4 |
| 7,107,206 B1 * | 9/2006 | Uchida et al. | .................. | 704/2 |
| 7,194,403 B2 * | 3/2007 | Okura et al. | ................... | 704/7 |
| 2001/0029455 A1 * | 10/2001 | Chin et al. | .................. | 704/277 |
| 2002/0120436 A1 * | 8/2002 | Mizutani et al. | ............... | 704/2 |

* cited by examiner

*Primary Examiner*—Don Wong
*Assistant Examiner*—Thanh-Ha Dang
(74) *Attorney, Agent, or Firm*—Buchanan Ingersoll & Rooney PC

(57) ABSTRACT

Processing a transmission between a user and a database, involving determining whether the transmission relates to a query or a response from the database, and if it relates to a query, restricting translation to a list of predetermined translation relations; and if it relates to a response, looking up the list to find a translation relation for a word in the response, and if no such translation relation exists for the word in the list, transmitting the word to a translation service to subsequently receive a translation relation between the word and a corresponding word in the user language, which translation relation is stored in the list. Consequently, words transmitted between the database and the user are only translated by means of a translating service—where ambiguities can be introduced—when the words are supplied from the database.

14 Claims, 5 Drawing Sheets

METHOD OF PROCESSING MULTI-LINGUAL QUERIES

This invention relates to a computer-implemented method of processing a transmission between a user and a database, wherein the database contains elements which conform to a base language, wherein elements can be contained in the transmission, and wherein references in a query to elements in the database conform to a user language, the method comprising the steps of providing elements from the database requested in the query in response to the query to the database, which elements can comprise words in the base language, wherein the query is generated in a user device and wherein the elements that are requested are supplied to the user device; and performing a natural language translation between words in elements in the base language and in the user language.

Databases of various types are central components in modern use of information technology. Databases can be of different types optimized for various purposes, but two main types can be, on the one hand, transactions databases that are optimized for fast storage and retrieval time and, on the other hand, so-called data warehouses (eng.: data warehouse) that are optimized for analyzing the data stored in the database. Typically, data warehouses contain more redundant data than a transaction database. The present invention is primarily related to data warehouses, but is not limited thereto.

Widespread use of the Internet is a heavy driver of the development of databases. In combination therewith, large organizations and/or companies located in different countries have boosted the need for databases supporting multiple natural languages.

A major issue within the technology of databases is to maintain the database and to ensure that the content of the database is coherent and consistent across various boundaries, such as language barriers in the database.

In order to provide an improved service to users of the database, users are provided with an interface to the database wherefrom it is possible to interact with the database in a preferred natural language (typically their mother tongue). A first basic solution to provide such an improved service is to represent content of the database in different languages. However, this is very cumbersome to handle in real life. Thus, another solution is to represent data in the database in a single natural language, a so-called base language, and carry out natural language translations in communicating with the database. However, unsupervised translations, which are desired since they can be carried out automatically and thus faster, are not suitable since the appearance of synonyms in a translation will destroy consistency of the database or alternatively generate erroneous queries to the database and/or responses from the database.

Thus if more than one possible translation of a word in a query to or in a response from a database can occur, ambiguities or errors can be introduced into the process of performing queries and achieving results.

Typically, words in the result of a first coarser query are used for refining the result by a later query. Since it is common that a word have more than one translation into words in another language, it is a problem—especially in refining queries—that translations are not ambiguous.

This problem is solved when the method mentioned in the opening paragraph is characterized in that it further comprises the steps of determining whether the transmission relates to a query or a response from the database, and if it relates to a query, restricting translation to a list of predetermined translation relations; and if it relates to a response, looking up the list to find a translation relation for a word in the response, and if no such translation relation exists for the word in the list, transmitting the word to a translation service to subsequently receive a translation relation between the word and a corresponding word in the user language, which translation relation is stored in the list.

Consequently, words transmitted between the database and the user are only translated by means of a translating service—where ambiguities can be introduced—when the words are supplied from the database. Storing a translation relation between the word from the database and a corresponding word in the user language ensures that this relation is valid for accessing precisely and unambiguously the elements identified by the word from the database. The translation of this word is thereby also stored in the list for subsequent use. Such subsequent use can be in a further query.

Avoiding ambiguity in a translation in the case that multiple translations of a word exist can be implemented by simply selecting e.g. a first from such multiple translations. This will not affect consistency with the database as long as the translation is suitable for the user to identify or recognize desired content in the database.

By the method according to the invention it is possible to query the database in the user's preferred language, the user language. Words regarding elements, which have previously been provided as output, are stored in the list. Thereby more detailed queries can be asked gradually which in turn allows for gradually increasing the number of words in the list.

Moreover, it is ensured that the words in the base language translated from the user language actually exist in the database. Thereby errors arising from translation ambiguities are avoided.

It should be understood, that the user language can be the language used in the database, the so-called base language, or it can be different from the base language.

Preferably, the method comprises the step of transmitting the corresponding word, in the user language, to the user device as a portion of the response from the database to the user device. Thereby the user is provided with a translated response from the database.

The method can comprise the step of rewording the query in user language, submitted from the user device, to a translated query in the base language to thereby process the query in the base language. This provides for the possibility, that the query can be translated automatically word-by-word, so that it is ensured, that the query in the user language is translated into a corresponding query in the base language, where the words in the corresponding query are unequivocal translations of words in the query in the user language. Moreover, translation relations between single words that have been translated once and have been used in earlier queries, in the base language and corresponding words in a user language can be reused in processing of queries containing these single words. This results in fewer translations and thereby reduced time consumption.

It is preferred that the translation relation between words in the user language and translated words in the base language is a "one word"-to-"one word" translation relation. Thus, despite a word may have multiple translations this will not affect the query to the database, but only the presentation of data. Thereby, unambiguous translations will not generate any database query errors.

The query can be generated using a start set of words, which are "one word"-to-"one word" translation relations of predetermined words in the base language and which are representing predetermined elements existing in the database. This has the advantage that no knowledge of the base language is required for generating a query. Thereby a user can employ the database entirely in his own language or in any other preferred user language.

Preferably, the predetermined words represent elements which are categories of elements in the database. Thereby a relevant, but typically limited and thus also less memory consuming set of words i.e. translation relations for generating a first coarse query in the database is provided in comparison with translation of all words in the database or of all categories or of other less limited sets of words.

Preferably, the start set of words is extended with a translation relation when receiving a response from the database and as a consequence of the step of storing the translation relation in the list to thereby form an extended set of words. Thereby, the translation relations stored in the list and originating from translations from base language to user language can be used for refining or extending further queries. As described above, the start set of words is a set of translation relations of predetermined words, which translation relations between words in the base language and corresponding words in the user language. The start set of words is preferably a set of words representing categories of elements for which queries can be generated. Examples of categories could be "Finances", "Personnel", "Companies", "Lines of business", "Turnover", "Profit", "Period"?, "Products", etc. Of course, the extended set of words depends upon the generated query. If the query for instance relates to "Turnover per product", the extended set of words can contain product groups and/or product names, e.g. "Dairy", "Bakery", "Miscellaneous", etc. If "Dairy" is chosen for refining the query, the extended set of words could contain "Milk", "Butter", "Cheese", etc. The extended set of words can be regarded as and used as a new start set of words for further queries.

Preferably, the extended set of words is pruned word-by-word in accordance with date of use or frequency of use of the word. Thus, the start set of words can be a static set of words, e.g. chosen by the administrator of the database, and the extended set of words can be dynamic, being extended during processing of queries to the database in another language than the base language. Typically, the administrator creates the start set of words on the basis of a database model of the content of the database. In general, the extended set of words will contain more translation relations than the start set of words, because a category typically contains more than one element. However, it is possible to find extended set of words that contain less translation relations than the start set of words, e.g. if all results from queries consist of numbers only. Finally, the extended set of words can contain zero translation relations, e.g. before the first query to the database or if the extended set of words is deleted from the list, which could be done regularly to avoid an excessive list size and consequently memory consumption. As explained above, the start set of words is a number of translation relations of predetermined words and the extended set of words is other translation relations created during use of the database. Thus, the start set of words is determined before the first use of the database, e.g. by the designer or administrator of the database. This determination of the start set of words can be an indication of words in the base language only, which words thereafter are translated to the user languages by the translation service, or the determination of the start set of words could contain words in the base language together with the translation relations to words in the user languages, so that the list is preloaded with translations relations by the administrator of the database. It is also possible, that the administrator preloads the list with translations relations of some of the words in the start set of words and that the rest of the words in the start set of words is translated automatically to the user languages by the translation service. Finally, it could be possible that the start set of words could be changed due to some other event than the administrator decision, e.g. automatically when new categories are included in the database.

It is conceivable that the extended set of words becomes excessively voluminous, which could be inconvenient. Additionally, the quality of translation services is improving, which makes it possible that newer translations are more accurate than older ones. These problems make it preferable to be able to eliminate already established translation relations in the list and are addressed by a preferred embodiment of the method according to the invention, where the extended set of words is pruned word-by-word in accordance with date of use or frequency of use of the word. For instance, it can be decided to prune words away from the extended set of words if said words have not been included in any query or result from a query for a certain amount of time, e.g. a month, a week, etc. Another possibility is to prune away all words from the extended set of words, except for the most used part of words, which part can be substantially any percentage of the extended set of words; this percentage will typically be set by an administrator of the database or by the user. Other possibilities of when and how to prune away words from the list are of course also possible.

In a preferred embodiment the method comprises the steps of: providing query components for selection by a user, which query components constitute parts of a query; and combining selected query components to generate a query. Thereby a user-friendly way of generating queries is provided, so that a user can concentrate on generating a query instead of being confused by minor, but crucial syntactical errors. According to one embodiment of the method according to the invention, the query components comprise words from the start set and/or words from the extended set.

Thereby, the user knows exactly which translations of the base language words that are available in the user language and he can easily generate queries on the basis of the existing start set of words and extended set of words.

Preferably, the method comprises the steps of providing an output result from the database on a user interface of the user device; and on said user interface providing possibilities to trigger new queries by means of pointing and clicking and thereby using output from former query as input in a subsequent query. This provides for especially user-friendly and easily performed refinements of queries.

In a preferred embodiment multiple lists of predetermined translation relations are provided; and preferably the method further comprises the step of selecting a list depending on information identifying a preferred user language and/or the identity of a user. This should be supported by a multitude of lists accessible to the users, so that a user's identity or preferred user language determines, which list is used. Thereby a user can take advantage of other users' use of the database and the resulting extension of the start set of words or his own prior use of the database and the ensuing extension of the start set of words.

Moreover, the invention relates to a computer readable medium encoded with a program for implementing the method when run on a computer; a computer system comprising a database and a computer being programmed to carry out the method; and a propagated signal carrying instructions for implementing the method when executed on a computer.

The invention will be explained more fully below in connection with a preferred embodiment and with reference to the drawing, in which.

Figure 1:
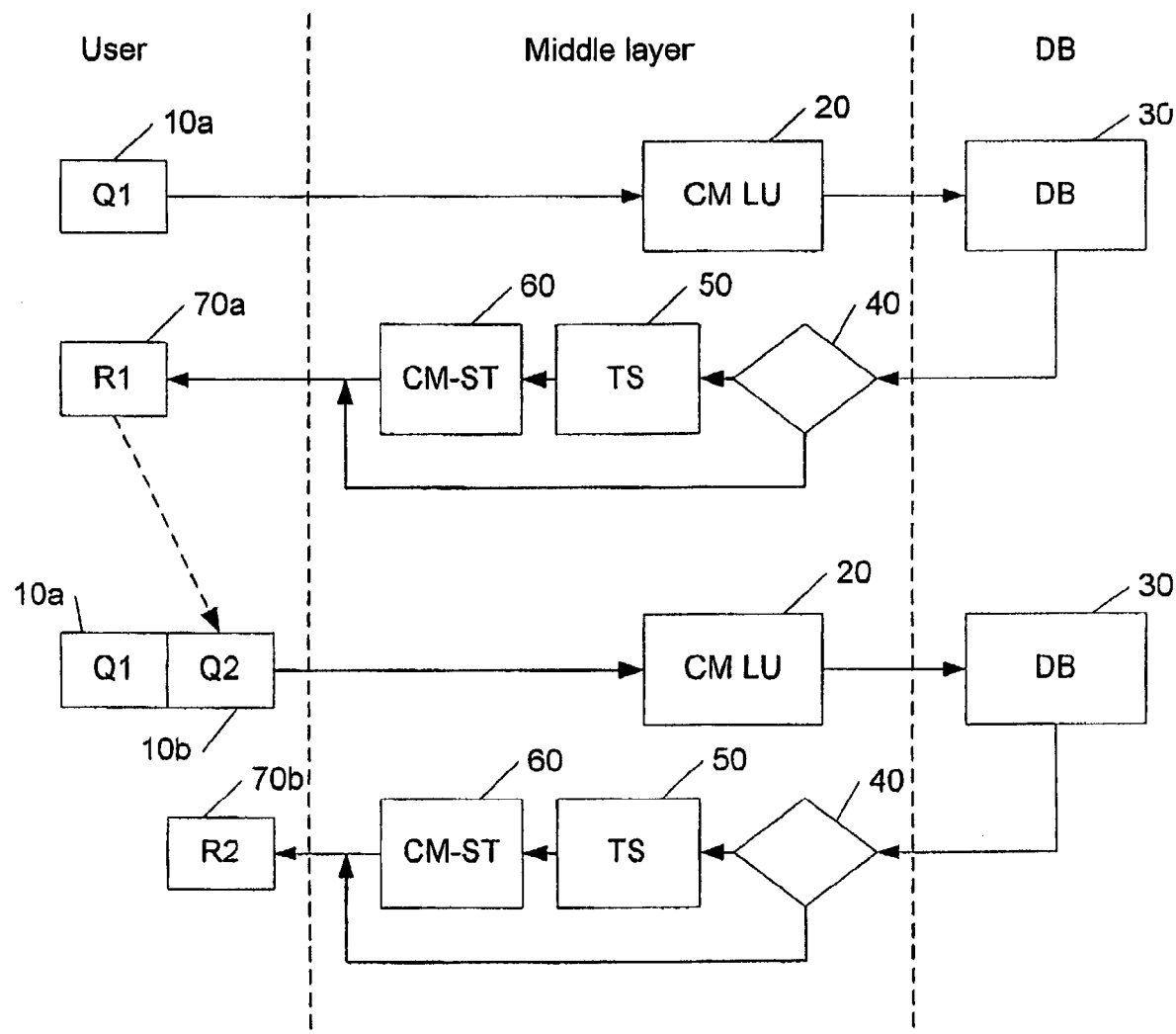
FIG. 1 is a collaboration diagram of the method according to the invention.

FIG. 1 is a block diagram of the invention. A user is generating queries Q1 10*a* to a database DB in a user language on the basis of the start set of words provided to his user interface (not shown). Since the query 10*a* is generated on the basis of the start set of words, a translation relation between the words within this start set of words in the user language and the base language exists in the list and this list is looked up 20 to find and use this translation relation and thereby to find the words in the base language corresponding to each word in the query Q1 in the user language. Thus, the query 10*a* is translated into the base language by means of translation relations in the list. These translation relations have been generated by means of a translating service and subsequently stored in the list. Which words should constitute the start set of words is typically determined by the designer or the administrator of the database.

Thereafter, the query is processed in the database 30, whereupon the process continues, 40, where it is determined, whether the response from the database contains words to be translated, i.e. words for which a translation relation do not exist in the list. If this is not the case, the flow continues directly to 70, giving a result of the query to the user. In the other case a translation service is used 50 to find one unambiguous translation of each word in the result of query to the database and this unambiguous translation is thereupon stored in the list 60 as a one-to-one relation. An example of a part of such a list is shown below in Table 1.

The words stored in the list 60 contribute to the extended set of words, which can be used by a user to form a further query Q2 10*b*. The processing of the query Q2, 10*b*-70*b*, is analogue to the processing of the query Q1, 10-70, but the set of words that the user can employ to form his query Q2 can be bigger than the set of words accessible in forming of the first query Q1, because the result from the first query can contain new words being translated into the user language and being stored in the extended set of words, as explained above, providing additional words in the extended set of words for subsequent queries.

It should be noted that it is possible to determine whether the transmission between the user device and the database relates to a query or a response from the database by determining the sender, the receiver or the content of the transmission. Thereby it is possible to determine whether the translation service shall be used (see decision unit 40) or whether the list shall be looked up (see CM LU, 20) to find a translation relation.

TABLE 1

Example of a part of a list

| Base language: English | User language | Translation into user language | Date stamp |
| --- | --- | --- | --- |
| Bakery | German | Bäckerei | 2000-04-05 |
| Dairy | German | Molkerei | 2000-04-05 |
| Brownies | German | Plätzchen | 2000-04-06 |
| Cookies | German | Plätzchen-2 | 2000-04-05 |

Table 1 shows an example of a part of a list. In this example the base language is English and the user language is German. The translation is performed from English (the base language) to German (the user language). As shown in Table 1 the two words "Brownies" and "Cookies" has the same translation in German. Therefore an index number is attached to the second translation to make sure, that all translations are one-to-one, i.e. that no words in the base language can have the same translation in the user language. The column "Date stamp" contains information regarding the date of storage of the translation relation, which information can be used in decisions regarding how long the translation relations are kept in the list. For instance it can be decided to prune words away from the extended set of words if said words have not been included in any query or result from a query for a certain amount of time, e.g. a month, a week, etc.

A rewording of a query in the user language, German, into the base language, English, can be performed on the basis of the translation relation in the list as in Table 1.

Figure 2:
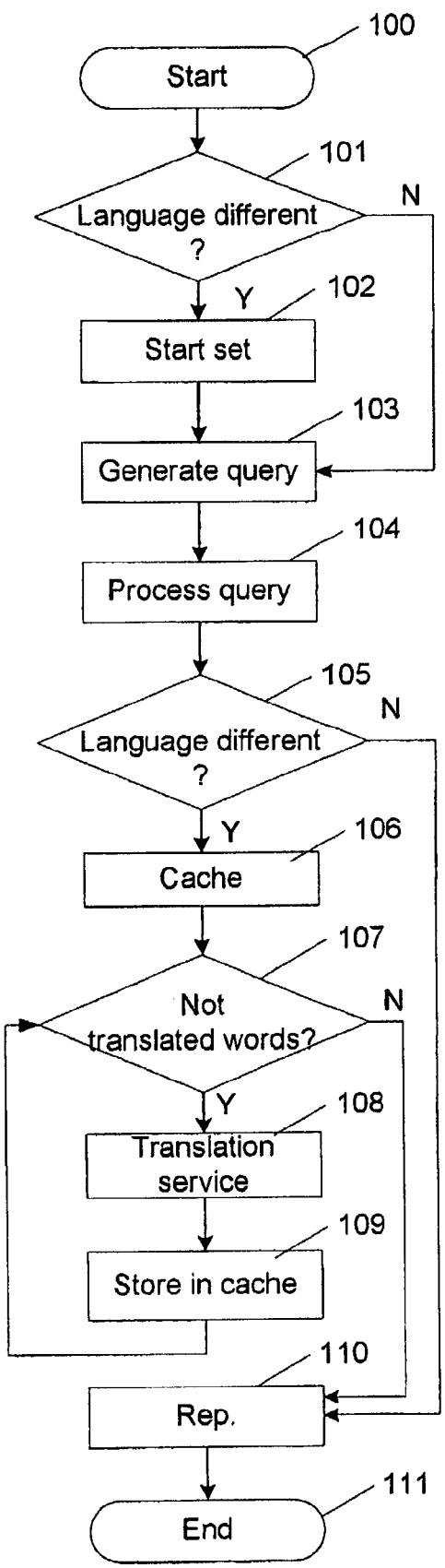
FIG. 2 is a flow chart of the method according to the invention.

Another possibility is to include information regarding the frequency of use of words in the list and to prune away all words from the extended set of words except for the most used part of words, which part can be substantially any percentage of the extended set of words. This percentage will typically be set by an administrator of the database or by the user FIG. 2 is a flow chart of the method according to the invention starting up in step 100. In step 101 it is decided, whether the user language is different from the base language. If this is the case, the flow continues to 102, where the start set of words is presented to the user 102 to assist in generating a query 103. If the user language is the same as the base language, the flow continues directly to step 103. Thus, the query can be generated in a manner per se well known in the art, if the user language is similar to the base language. The start set of words is stored in the list. In step 104 the query is processed in a well-known manner to generate a database response, whereupon it is determined again, step 105, whether the base language is different from the user language.

If this is the case, the list is looked up, step 106, to search for translation relations for words contained in the database response. If a translation relation exists for a word in the database response, this translation relation is used to perform an unambiguous translation of said word. In step 107 it is determined, if the database response contains any words, for which no translation relation is stored in the list. If this is the case, the flow continues to step 108, where a translation service is used to generate a translation relation for each of the words, for which no translation relation is stored in the list. This translation service can be local, on an intranet or on the internet. The translation relations generated in step 108 is stored in the list, step 109. This storing of translation relations in the provision of the database response in the user language is used to extend the start set of words to an extended set of words that can be used in further queries as the start set in step 102. After step 109 the flow returns to step 107 to determine whether the database response contains any more words, for which no translation relation is stored in the list, and the steps 107-109 is repeated until this is no longer the case and the flow then continues to step 110, where a reporting of the database response is performed in the user language, and the flow ends, step 111. In an alternative embodiment it is possible that a user, whose preferred user language is equal to the base language, is also provided with a start set of words to assist him in generating a query.

As noted above translation is made by using a translation service available on the intranet, the Internet or locally. An example could be translation of the following words:

Bakery
Dairy
Miscellaneous

This could be done by submitting a query to a translation service on the Internet, for instance by querying:

translationservice.company/translate?ing=en_ge&words=bakery+dairy+miscellaneous.

The document in reply to this hypothetical service is a document with the following words
Bäckerei
Molkerei
Verschieden.

The invention of course also covers other methods of performing translations via a translation service.

Figure 3:
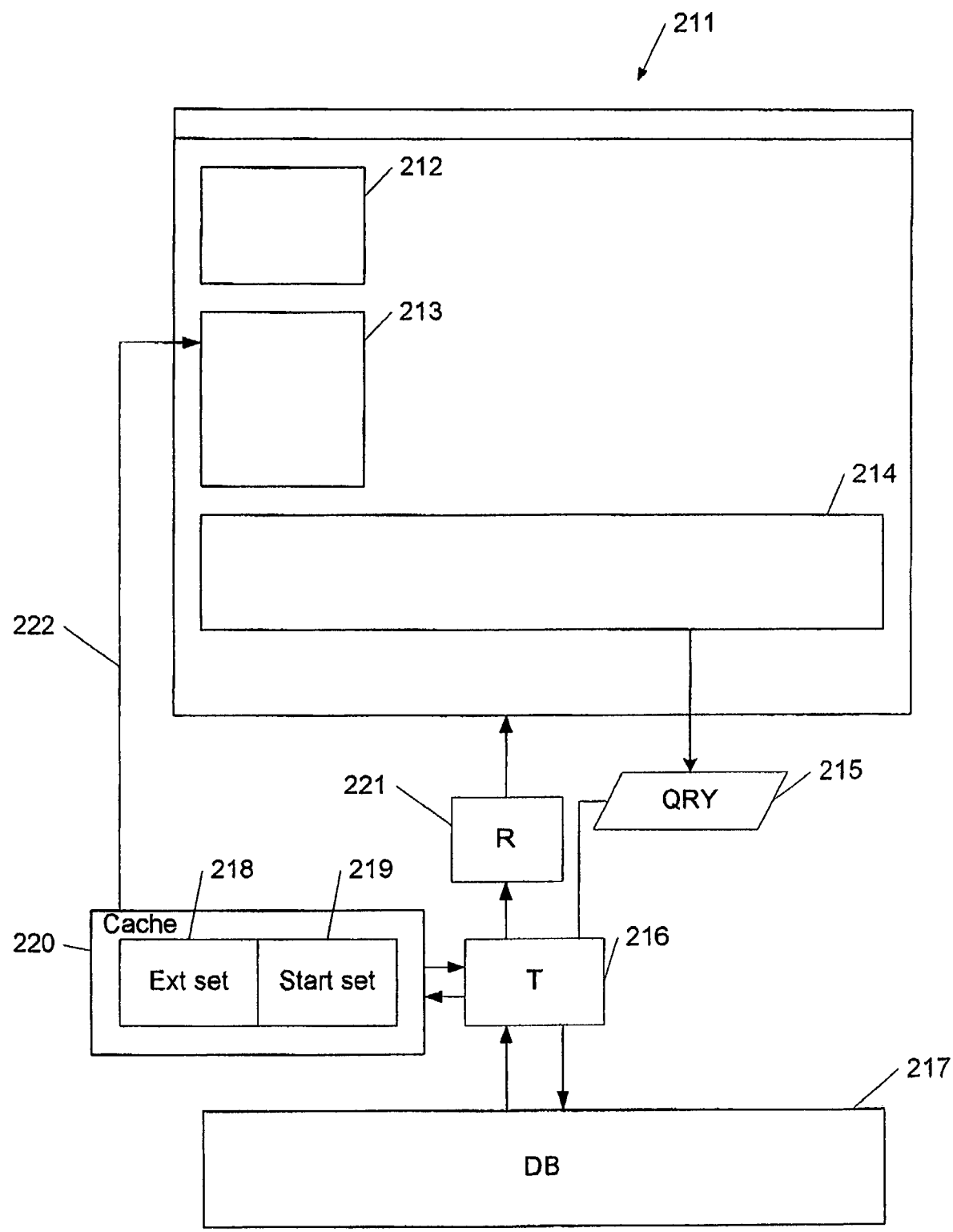
FIG. 3 shows an example of a combined block-diagram and user interface for generating and processing a query according to the invention.

FIG. 3 shows a combined block-diagram and user interface 211 of a user system. The user interface supports creation of structured queries by means of fields 212-214. As an example, in the field 212 the user can choose available options, e.g. names, titles, units, numbers, according to the type of information held in the database; some options are based on previous choices. The field 213 can e.g. contain a listing of the start set of words or of the extended set of words.

During the selection of options, which can constitute query components of the query, the user can see the current query in a field 214. According to one embodiment of the invention, the interface can support the generation of the query in a natural, human language. The user can be presented with predetermined parts of an incomplete sentence, for example "I would like to create a report." and by selecting various options, phrases are added, until a full paragraph is constructed describing all details about the desired database search, and this paragraph is shown in the field 214 on the user interface. The phrases can be added in any sequence and the paragraph can be changed by editing or removing query components. Other examples of incomplete sentences to be chosen could be "with the title.", "The information on the report should be grouped by . . . ", "The report should be formatted with . . . ". It is understood that these examples are non-limiting examples and that many other types are conceivable. It should be noted, that the order of succession between these incomplete sentences is unimportant. The incomplete sentences can be shown in the field 212, and the elements to choose between can be shown in the field 213. The provision of query components could be effected in the user interface by means of check boxes, drop down lists, point and click buttons or a field for entering text or in any other convenient way. Activation of a field on the user interface (not shown) submits the requested database search relating to the query generated in the field 216. To the user it appears, that he can write in a natural language as opposed to programming language or computer language or a special database querying language containing codes and a special syntax. However, the structured query really is structured in contrast to free text, as the user chooses between incomplete, existing sentences.

In the above, a way of forming a structured query by means of text is explained. It is also possible to form a structured query by letting the user choose between different presentation ways, e.g. a graph, a table, a diagram, a bar chart, and thereafter letting him indicate the elements to be shown in the selected presentation form, e.g. by means of drop down boxes with text, and eventually the formats or other requirements of how to show the data on the user interface. Of course other ways of forming structured queries are conceivable, too.

The query is then routed through a translation service 216 to find translations between words in a user language in the query and corresponding words in the base language. This provision of translations is supported by the list 220, which contains a start set of words 218 and an extended set of words 219. The query is then routed to the database 217, is processed therein and is then routed to the translation service again to find translation relations between words in the base language in the database response and corresponding words in the user language. Again, this translation is supported by the list, so that translation relations, if any, in the list is used. If no such translation relations exist in the list, new translation relations are found of the words not represented in the list by means of the translation service and these are stored in the extended set of words.

Figure 4:
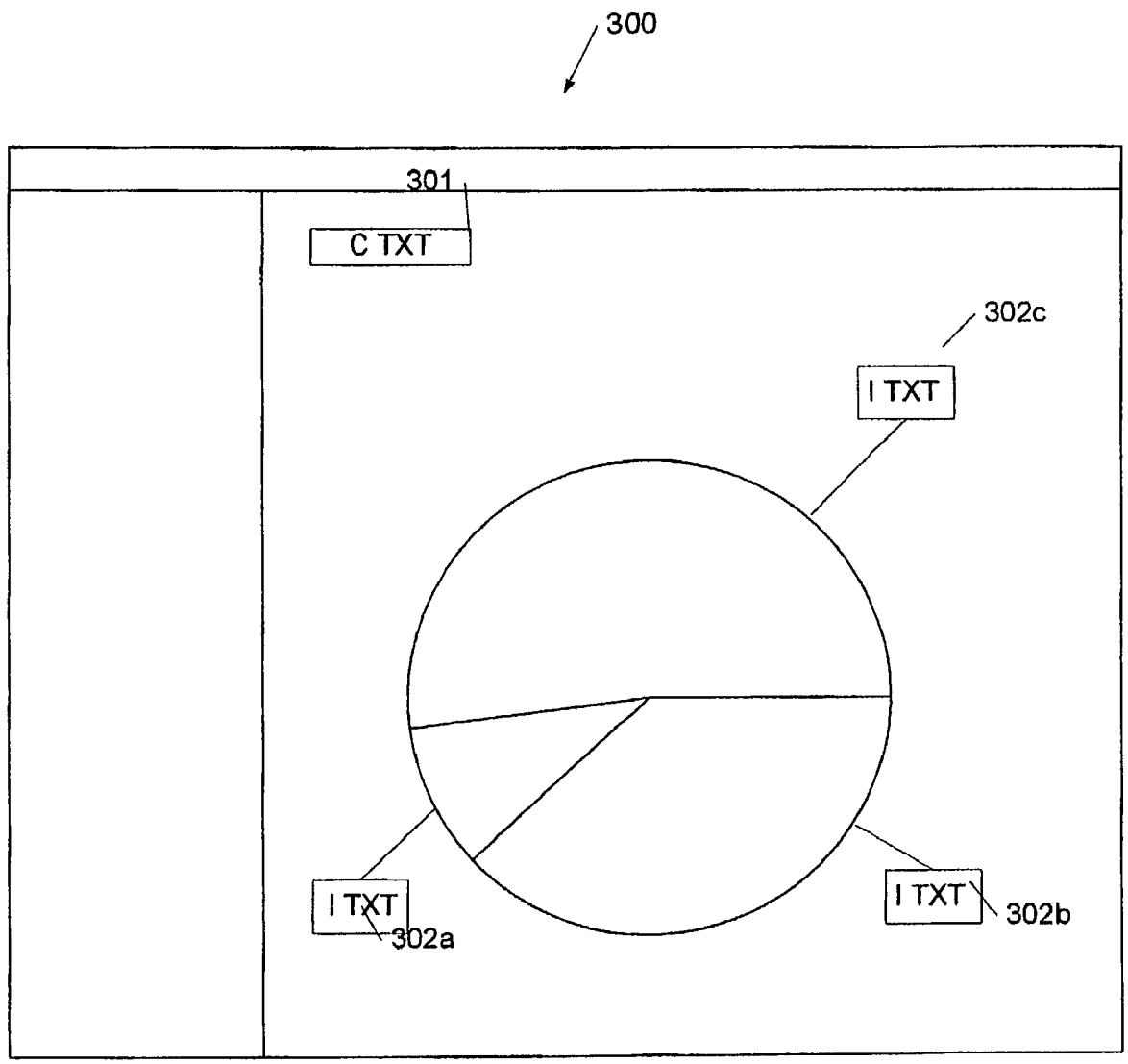
FIG. 4 shows an example of an output result on a user interface.

As is shown by the arrow 222 the content of the list is used in the listing in the field 213 in the user interface 211. The translation performed in 216 is used to generate a response 221 to the user, which response 221 can be shown on the user interface in a variety of ways. One example is shown in FIG. 4, which shows a non-limiting example of an output result on a user interface 300.

The user interface 300 contains fields 301 and 302a-c. The field 301 contains text information regarding a category and the fields 302a-302c contain text information regarding elements. Examples of categories could be "Turnover per product", "Profit per product", etc.; and examples of elements could be "Product name", "Product group", etc. In the user interface 300 the field 301 could thereby contain the words "Turnover per product" and the fields 302a-302c could contain the words "Dairy", "Bakery", "Miscellaneous". As a refinement of this query a user could be able to request more detailed information by pointing at and clicking an object on the user interface. This further query could for instance be to query about the turnover per product in the product group "Dairy" and corresponding examples of elements could be "Milk", "Butter", "Cheese", etc. Again this query can be refined; for instance into the different kinds of cheese. One important feature of the invention regarding the user interface is that the user only sees text in his preferred user language, so that all words in the output response are translated into the user language. Another important feature according to the invention is that the translations of the refined queries are based on the list, so that one-to-one translations between elements in the base language and corresponding translations in the user language are always ensured.

Typically, the text in the field 301 would be one or more words from the start set of words, while the text in the fields 302a-302c would be words, which after this query will be stored as words in the extended set of words.

Figure 5:
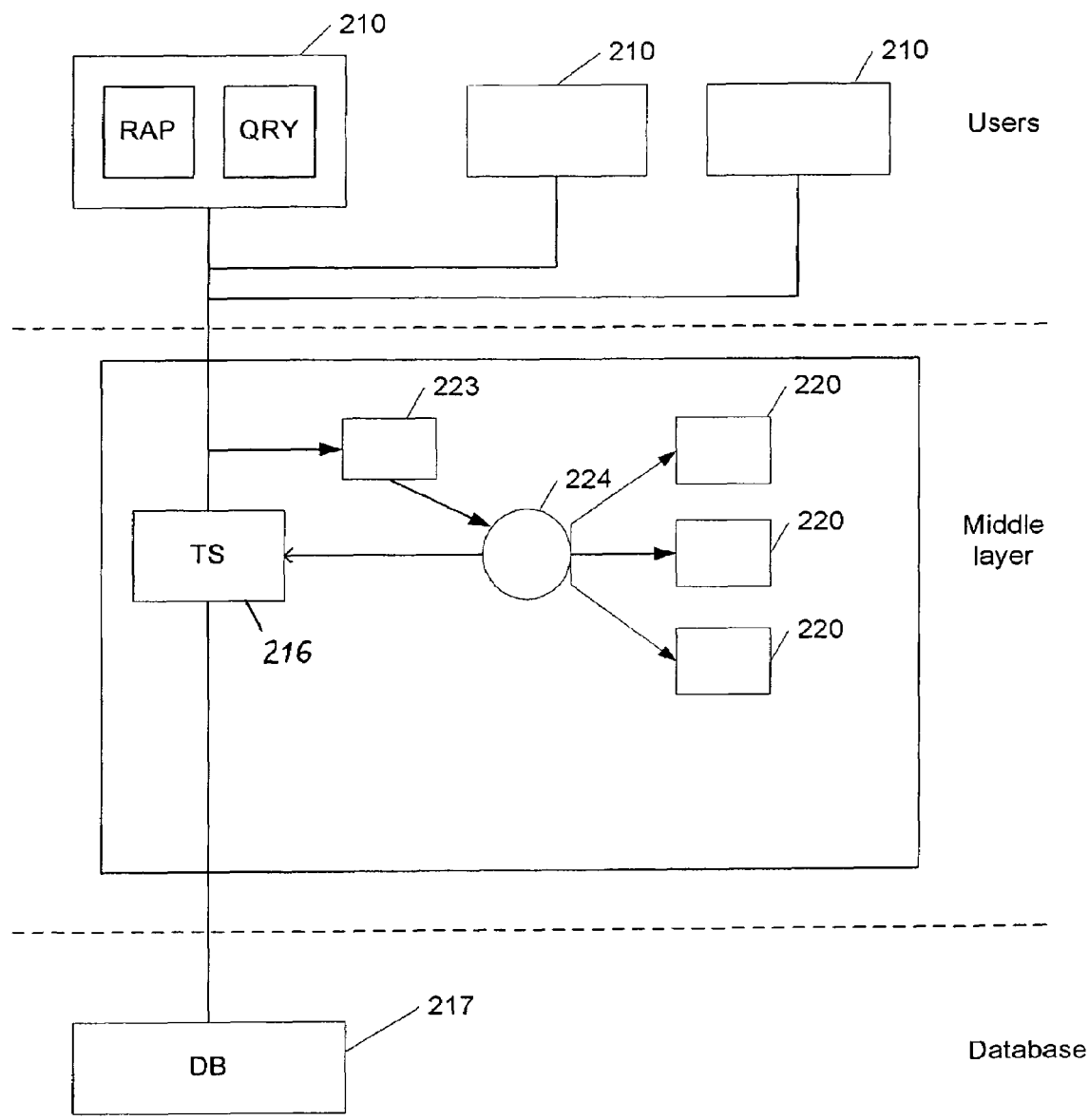
FIG. 5 is a structure diagram of the method according to the invention.

FIG. 5 shows by way of non-limiting example a structure diagram of the method according to the invention supporting a multitude of users. For the sake of clarity only three users 210 are shown, but it should be understood, that substantially any number of users could be involved. The method according to the invention supports use in a multitude of user languages. A user 210 makes a query in his preferred language, the user language. This query is routed to the translations service 216, while information regarding the user language and/or user identity is extracted in 223 and sent to 224, where a choice is made between which list should be used among a multitude of cache memories 220 in the translation between user language and base language. It should be noted that the number of cache memories could be equal to, smaller than or bigger than the number of users. For example, one list 220 could be allocated to each user 210 or one list 220 could be allocated to each user language. After identification of the user language and selection of the corresponding list, the processing of the query in the database in the base language is performed as explained above. The queries are generated as explained with relation to FIG. 3, the queries are processed as explained with relation to FIGS. 1 and 2 and the results are output as explained with relation to FIGS. 3 and 4.

It is understood that a skilled person may adapt the above embodiments, e.g. by adding or removing features, or by combining features of the above embodiments.

Please note that the list of translation relations also are denoted a cache memory, CM. The list or cache memory may be embodied as a table or similar structure in a database. Alternatively, the list can be embodied as a simple file in an electronic file system.

The feature 'translation relation' comprises any type of relation between at least two natural language words, abbreviations, sentences, or other language constructs.

In a preferred embodiment the invention is implemented as a middle-layer software component (described in detail above) on a server computer that is connected to a database and that is connected to at least one client computer. Software components on the client computer is arranged to provide for the interaction with the user(s) or administrator(s) as also described in detail above. The database, the server computer and the client computer can be interconnected by means of a data network e.g. Local Area Network or Wide Area Network.

The memory (including the list) may include magnetic tape, optical disc, digital video disk (DVD), compact disc (CD or CD-ROM), mini-disc, hard disk, floppy disk, ferroelectric memory, electrically erasable programmable read only memory (EEPROM), flash memory, EPROM, read only memory (ROM), static random access memory (SRAM), dynamic random access memory (DRAM), synchronous dynamic random access memory (SDRAM), ferromagnetic memory, optical storage, charge coupled devices, smart cards, PCMCIA card, etc.

Input means for receiving input for a user and/or an administrator may comprise a keyboard, a keypad, a button and or an arrangement of buttons, a touch screen, a pointing device, such as a mouse, a trackball, a touch pad, a digital pen, or the like. Input means may further comprise other forms of man-machine interfaces, such as a voice interface, or the like.

Output means for providing output to a user and/or an administrator may comprise a display device, such as a monitor, a liquid crystal display, a cathode ray tube to display a graphical user interface or another man-machine interface. Alternatively or additionally, the output means may comprise an audible output device, such as a sound card and or a speaker.

Processing means for executing a program or software component implementing the invention may include a microprocessor, an application-specific integrated circuit, or another integrated circuit, a smart card, a general purpose computer adapted by suitable software, or the like.

A computer readable medium may be magnetic tape, optical disc, digital videodisc (DVD), compact disc (CD or CD-ROM), mini-disc, hard disk, floppy disk, smart card, PCMCIA card etc.

The invention claimed is:

1. A computer-implemented method of processing a transmission between a user device and a database, wherein:
the transmission contains elements conforming to a base language or a user language that is different than the base language,
the database contains elements which conform to the base language, and
references to elements included in queries to the database conform to the user language,
the method comprising:
in a response to a query to the database from the user device, providing a plurality of said elements from the database requested in the query to the user device, said provided elements comprising words in the base language;
performing a natural language translation of the words in the provided elements from the base language to the user language;
determining whether the transmission between the user device and the database relates to said queries to the database from the user device or to responses from the database to the user device;
if the transmission relates to said queries to the database from the user device, restricting translation to a list of predetermined translation relations;
if the transmission relates to said responses from the database to the user device, looking up the list of predetermined translation relations to find a translation relation in the list for a word in the provided elements; and
if no translation relation exists in the list for the word in the provided elements:
transmitting the word in the response to a translation service,
subsequently receiving a translation relation between the word in the response and a corresponding word in the user language, and
storing the received translation relation in the list.

2. The method according to claim 1, further comprising:
transmitting the word, in the user language, to the user device as a portion of the response from the database to the user device.

3. The method according to claim 1, further comprising:
rewording the query in the user language, submitted from the user device, to a translated query in the base language; and
processing the query in the base language.

4. The method according to claim 1, wherein the translation relation between words in the user language and translated words in the base language is a "one word"-to-"one word" translation relation.

5. The method according to claim 1, wherein the query is generated using a start set of words, which are "one word"-to-"one word" translation relations of predetermined words in the base language and which represent predetermined elements existing in the database.

6. The method according to claim 5, wherein the predetermined words represent elements, which belong to categories of elements in the database.

7. The method according to claim 6, wherein the start set of words is extended when receiving the response from the database and as a consequence of the step of storing the received translation relation in the list to thereby form an extended set of words.

8. The method according to claim 7, wherein the extended set of words is pruned word-by-word in accordance with date of use or frequency of use of the word.

9. The method according to claim 1, further comprising:
providing query components for selection by a user, wherein the query components constitute parts of the query; and
combining selected query components to generate the query.

10. The method according to claim 9, wherein the query components comprise words from the start set and/or words from the extended set.

11. The method according to claim 1, further comprising:
providing an output result from the database on a user interface of the user device; and
on said user interface, providing possibilities to trigger new queries by means of pointing and clicking and thereby using output from former query as input in a subsequent query.

12. The method according to claim 1, wherein:
multiple lists of predetermined translation relations are provided; and
the method further comprises selecting one of the lists depending on information identifying a preferred user language and/or the identity of a user.

13. A computer readable medium encoded with a program for implementing the method as set forth in claim 1 on a computer.

14. A computer system comprising a database and a computer being programmed to carry out the method as set forth in claim 1.

* * * * *